United States Patent
Inoue et al.

(10) Patent No.: US 11,280,244 B2
(45) Date of Patent: Mar. 22, 2022

(54) HONEYCOMB STRUCTURE, ELECTRIC HEATING TYPE HONEYCOMB STRUCTURE, ELECTRIC HEATING TYPE CATALYST AND EXHAUST GAS PURIFYING DEVICE

(71) Applicant: NGK INSULATORS, LTD., Nagoya (JP)

(72) Inventors: Takayuki Inoue, Nagoya (JP); Kohei Yamada, Nagoya (JP); Makoto Hamazaki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 159 days.

(21) Appl. No.: 16/816,787

(22) Filed: Mar. 12, 2020

(65) Prior Publication Data

US 2020/0400057 A1 Dec. 24, 2020

(30) Foreign Application Priority Data

Jun. 18, 2019 (JP) .............................. JP2019-113001

(51) Int. Cl.
| | | |
|---|---|---|
| *F01N 3/28* | (2006.01) | |
| *F01N 3/20* | (2006.01) | |
| *C04B 35/565* | (2006.01) | |
| *B01D 53/94* | (2006.01) | |

(52) U.S. Cl.
CPC ........... *F01N 3/2825* (2013.01); *B01D 53/94* (2013.01); *C04B 35/565* (2013.01);
(Continued)

(58) Field of Classification Search
CPC ........ F01N 3/28; F01N 3/2006; F01N 3/2013; F01N 3/2026; F01N 3/2825; F01N 3/2828; F01N 3/2803; F01N 3/2807; F01N 3/281; F01N 3/2814; F01N 3/2842; F01N 2300/00; F01N 2330/02; F01N 2330/06; F01N 2330/30; F01N 2240/04; F01N 2240/16; F01N 2550/22; F01N 2900/06; B01D 53/94; B01D 71/027; B01D 71/028;
(Continued)

(56) References Cited

U.S. PATENT DOCUMENTS

| | | | | |
|---|---|---|---|---|
| 7,785,544 | B2 * | 8/2010 | Alward | F01N 3/2835 |
| | | | | 422/179 |
| 9,333,490 | B2 * | 5/2016 | Kazi | B01D 53/944 |
| 9,976,466 | B2 * | 5/2018 | Takase | F01N 3/2828 |
| 2012/0093695 | A1 * | 4/2012 | Iwakura | F01N 3/0222 |
| | | | | 422/169 |

(Continued)

FOREIGN PATENT DOCUMENTS

JP 5735428 B2 6/2015

OTHER PUBLICATIONS

Chinese Office Action (Application No. 202010106353.5) dated Dec. 3, 2021.

*Primary Examiner* — Bin Q Tran
(74) *Attorney, Agent, or Firm* — Burr & Brown, PLLC (57) ABSTRACT

A honeycomb structure includes: an outer peripheral wall; and partition walls disposed on an inner side of the outer peripheral wall, the partition walls defining a plurality of cells, each of the plurality of cells extending from one end face to the other end face to form a flow path for a fluid. The partition walls and the outer peripheral wall include ceramics containing at least silicon. A content of silicon in the ceramics is 30% by mass or more. A concentration of at least one dopant in the silicon is from $10^{16}$ to $5\times10^{20}/cm^3$.

11 Claims, 3 Drawing Sheets

(52) U.S. Cl.
CPC ........ *F01N 3/2013* (2013.01); *F01N 2330/00* (2013.01); *F01N 2330/06* (2013.01)

(58) Field of Classification Search
CPC .. B01D 71/24; B01D 71/70; B01D 2253/106; B01D 2253/108; B01D 2253/1085; C04B 35/565; C04B 35/117; C04B 35/185; C04B 35/195; C04B 35/488; C04B 35/581; C04B 35/584; C04B 35/6263; C04B 38/0009; C04B 2111/00793; C04B 2235/386; C04B 2235/6567; C04B 2235/402; C04B 2235/42; C04B 2235/421; C04B 2235/428; C04B 2235/5436; C04B 2235/663; C04B 2235/72; C04B 2235/80; Y02T 10/12
See application file for complete search history.

(56) References Cited

U.S. PATENT DOCUMENTS

| | | | |
|---|---|---|---|
| 2012/0183725 A1 | 7/2012 | Noguchi et al. | |
| 2013/0036719 A1* | 2/2013 | Noguchi | F01N 3/2026 55/523 |
| 2014/0294692 A1 | 10/2014 | Kikuchi et al. | |
| 2015/0013284 A1* | 1/2015 | Ota | C04B 35/62897 55/385.3 |
| 2015/0292386 A1* | 10/2015 | Nishigaya | F01N 3/2026 60/320 |
| 2019/0160427 A1* | 5/2019 | Deeba | B01J 23/63 |

* cited by examiner

HONEYCOMB STRUCTURE, ELECTRIC HEATING TYPE HONEYCOMB STRUCTURE, ELECTRIC HEATING TYPE CATALYST AND EXHAUST GAS PURIFYING DEVICE

FIELD OF THE INVENTION

The present invention relates to a honeycomb structure, an electric heating type honeycomb structure, an electric heating type support, and an exhaust gas purifying device. More particularly, the present invention relates to a honeycomb structure, an electric heating type honeycomb structure, an electric heating type support, and an exhaust gas purifying device, which can satisfactorily suppress generation of excess current even if they are used under a lower voltage.

BACKGROUND OF THE INVENTION

Conventionally, a member having a catalyst supported on a honeycomb structure made of cordierite or silicon carbide is used for treatment of harmful substances in exhaust gases discharged from motor vehicle engines. Such a honeycomb structure generally has a pillar shaped honeycomb structure that includes partition walls defining a plurality of cells extending from one end face to the other end face to form flow paths for an exhaust gas.

For the treatment of the exhaust gas with the catalyst supported on the honeycomb structure, a temperature of the catalyst is required for being increased to a predetermined temperature. However, as the engine is started, the catalyst temperature is lower, conventionally causing a problem that the exhaust gas is not sufficiently purified. Therefore, a system called an electric heating catalyst (EHC) has been developed. In the system, electrodes are disposed on a honeycomb structure made of conductive ceramics and the honeycomb structure itself generates heat by electrical conduction, whereby the temperature of the catalyst supported on the honeycomb structure is increased to an activation temperature before or during starting of the engine.

When using the EHC mounted on, for example, a motor vehicle or the like, a power source used for an electric system of the motor vehicle or the like is commonly used. Therefore, if an excessive current flows through the EHC, a power supply circuit may be damaged. Since various voltages are used for the power supply for the EHC, it is important to adjust resistance of the honeycomb structure for the EHC for each voltage to be used and to control it such that the excessive current does not flow.

Patent Literature 1 proposes a honeycomb structure having a volume resistivity in a certain range, which serves as a catalyst support and also functions as a heater.

CITATION LIST

Patent Literature

Patent Literature 1: Japanese Patent No. 5735428 B

SUMMARY OF THE INVENTION

The present invention is specified as follows:
(1)
A honeycomb structure, comprising: an outer peripheral wall; and partition walls disposed on an inner side of the outer peripheral wall, the partition walls defining a plurality of cells, each of the plurality of cells extending from one end face to the other end face to form a flow path for a fluid,
wherein the partition walls and the outer peripheral wall comprise ceramics containing at least silicon;
wherein a content of silicon in the ceramics is 30% by mass or more;
wherein a concentration of at least one dopant in the silicon is from $10^{16}$ to $5 \times 10^{20}$/cm$^3$.
(2)
An electric heating type honeycomb structure, comprising:
the honeycomb structure according to (1); and
a pair of electrode layers disposed so as to face each other across a central axis of the honeycomb structure, each of the electrode layers being disposed on a surface of the outer peripheral wall of the honeycomb structure.
(3)
An electric heating type support, comprising:
the electric heating type honeycomb structure according to (2); and
a pair of metal terminals disposed so as to face each other across a central axis of the electric heating type honeycomb structure, the pair of metal terminals being disposed on the pair of the electrode layers.
(4)
An exhaust gas purifying device, comprising:
the electric heating type support according to (3); and
a can body for holding the electric heating type support.
(5)
A honeycomb structure, comprising: an outer peripheral wall; and partition walls disposed on an inner side of the outer peripheral wall, the partition walls defining a plurality of cells, each of the plurality of cells extending from one end face to the other end face to form a flow path for a fluid,
wherein the partition walls and the outer peripheral wall comprises ceramics, wherein the ceramics contain:
silicon; and
at least one selected from the group consisting of alumina, mullite, zirconia, cordierite, silicon carbide, silicon nitride, and aluminum nitride;
wherein a content of silicon in the ceramics is 30% by mass or more;
wherein the silicon contains B as a dopant; and
wherein the honeycomb structure has a volume resistivity of 0.01 Ω·cm or more and 5 Ω·cm or less.

DETAILED DESCRIPTION OF THE INVENTION

The honeycomb structure as described in Patent Literature 1 is formed of a Si—SiC material. Si and SiC have slightly higher volume resistivity. Therefore, even if the honeycomb structure as described in Patent Literature 1 is used for the EHC used under a higher voltage of from 200 to 500 V, the volume resistivity can be adjusted within a resistance range of from about several 0 cm to 200 Ωcm. As a result, when used under a higher voltage of from 200 to 500 V, it can suppress an excessive current to flow.

However, a very wide range of voltages is used for the power supply for the EHC depending on, for example, types of motor vehicles to be mounted and the like. In particular, when a lower voltage of 60 V or less, for example 48 V, is used as the power supply for the EHC, it is necessary to adjust the volume resistivity within a resistance range of the order of 0.1 Ωcm in order to suppress generation of an excessive current. Thus, there is a need for research and development of a technique for satisfactorily suppressing the generation of the excessive current even if it is used under a lower voltage, in the recent EHC in which a wide range of voltage is used.

The present invention has been made in view of the above problems. An object of the present invention is to provide a honeycomb structure, an electric heating type honeycomb structure, an electric heating type support, and an exhaust gas purifying device, which can satisfactorily suppress generation of excess current even if they are used under a lower voltage.

As a result of intensive studies, the present inventors have found that the above problems can be solved by containing at least silicon in the partition walls and the outer peripheral wall of the honeycomb structure, and controlling a concentration of a dopant(s) in the silicon to a predetermined range.

According to the present invention, it is possible to provide a honeycomb structure, an electric heating type honeycomb structure, an electric heating type support, and an exhaust gas purifying device, which can satisfactorily suppress generation of excess current even if they are used under a lower voltage.

Hereinafter, embodiments of a honeycomb structure, an electric heating type honeycomb structure, an electric heating type support, and an exhaust gas purifying device according to the present invention will be described with reference to the drawings. However, the present invention is not limited to the embodiments, and various changes, modifications, and improvements may be added without departing from the scope of the present invention, based on knowledge of those skilled in the art.

(1. Honeycomb Structure and Electric Heating Type Honeycomb Structure)

Figure 1:
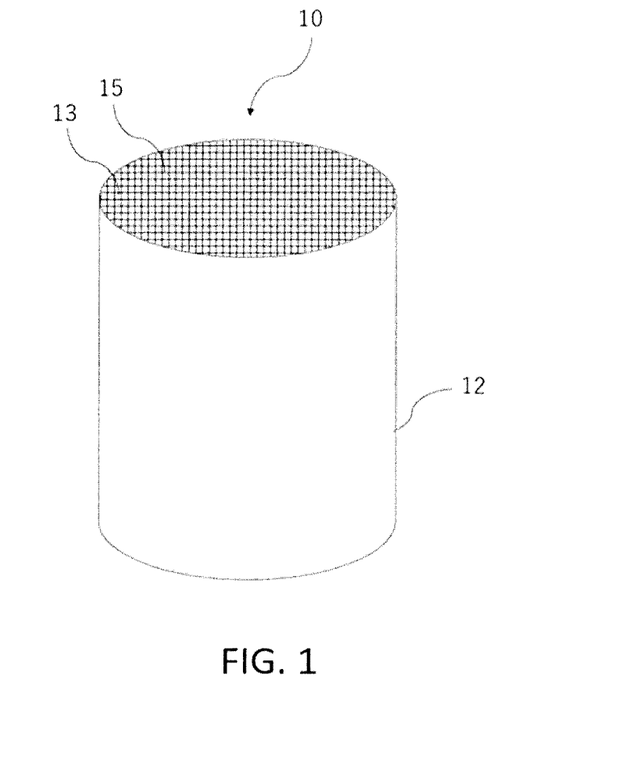
FIG. 1 is a schematic external view of a honeycomb structure 10 according to an embodiment of the present invention.

FIG. 1 is a schematic external view of a honeycomb structure 10 according to an embodiment of the present invention. The honeycomb structure 10 includes: an outer peripheral wall 12; and partition walls 13 which are disposed on an inner side of the outer peripheral wall 12 and define a plurality of cells 15 penetrating from one end face to other end face to form flow paths, and the honeycomb structure 10 is pillar-shaped.

The partition walls 13 and the outer peripheral wall 12 of the honeycomb structure 10 are made of ceramics containing at least silicon, and have a concentration of at least one dopant in silicon of from $10^{16}$ to $5\times10^{20}/cm^3$. Examples of ceramic materials other than silicon forming the partition walls 13 and the outer peripheral wall 12 of the honeycomb structure 10 include, but not limited to, oxide ceramics such as alumina, mullite, zirconia, and cordierite, as well as non-oxide ceramics such as silicon carbide, silicon nitride, and aluminum nitride. Since these ceramic materials function as aggregate particles for the honeycomb structure 10, the honeycomb structure 10 can be strengthened.

In the honeycomb structure 10 according to an embodiment of the present invention, the concentration of the dopant in silicon contained in the partition walls 13 and the outer peripheral wall 12 is $10^{16}$ to $5\times10^{20}/cm^3$, so that the volume resistivity of the honeycomb structure 10 can be decreased. The concentration of the dopant in silicon contained in the partition walls 13 and the outer peripheral wall 12 can be adjusted as needed depending on a desirable volume resistivity of the honeycomb structure 10. In general, as the concentration of the dopant in silicon increases, the volume resistivity of the honeycomb structure 10 decreases, and as the concentration of the dopant in silicon decreases, the volume resistivity of the honeycomb structure 10 increases. The present inventors have found that the volume resistivity of the honeycomb structure 10 can be effectively decreased by doping with silicon as a simple substance, rather than a silicon compound such as silicon carbide and silicon nitride which function as aggregate particles as describes above. The concentration of the dopant in silicon is more preferably from $5\times10^{17}$ to $5\times10^{20}/cm^3$.

The volume resistivity of the honeycomb structure 10 may be set as needed, depending on to an applied voltage, and is not particularly limited. For example, it may be from 0.001 to 200 Ω·cm. For higher voltages greater than 60 V, it can be from 2 to 200 Ω·cm, and typically from 5 to 100 Ω·cm. For lower voltages of 60 V or less such as 48 V, the volume resistivity can be from 0.001 to 2 Ωcm, and typically from 0.001 to 1 Ω·cm, and more typically from 0.01 to 1 Ω·cm. More particularly, in the honeycomb structure 10 according to an embodiment of the present invention, the concentration of the dopant in silicon contained in the partition walls 13 and the outer peripheral wall 12 is from $10^{16}$ to $5\times10^{20}/cm^3$, so that the volume resistivity of the honeycomb structure 10 can be decreased such that an excess current is not generated even if it is used for a lower voltage of 60 V or less such as 48 V. Further, the volume resistivity of the honeycomb structure may be 0.01 Ω·cm or more and 5 Ω·cm or less. When the volume resistivity is 5 Ω·cm or less, the generation of the excess current can be satisfactorily suppressed even under a lower voltage of 48V. On the other hand, if the volume resistivity is more than 5 Ω·cm, the generation of the excess current cannot be sufficiently suppressed under a lower voltage of 48V.

The dopant in silicon contained in the partition walls 13 and the outer peripheral wall 12 may preferably be Group 13 elements or Group 15 elements. The Group 13 or Group 15 elements can be easily contained as dopants in silicon in the concentration range of from $10^{16}$ to $5\times10^{20}/cm^3$. As used herein, the Group 13 elements refer to boron (B), aluminum (Al), gallium (Ga), indium (In), and the like, and the Group 15 elements refer to nitrogen (N), phosphorus (P), arsenic (As), antimony (Sb), bismuth (Bi) and the like. A plurality of types of elements may be contained as long as the dopants in silicon contained in the partition walls 13 and the outer peripheral wall 12 are elements belonging to the same group, because they can exhibit conductivity without being affected by counter doping. It is more preferable that one or two dopants selected from the group consisting of B and Al are used. It is also preferable that one or two dopants selected from the group consisting of N and P are used. B, Al, N and P can be more easily contained as dopants in silicon in the concentration range of from $10^{16}$ to $5\times10^{20}/cm^3$.

The volume resistivity of the honeycomb structure 10 can be controlled as needed, in addition to by controlling the concentration of the dopant in silicon contained in the partition walls 13 and the outer peripheral wall 12 to $10^{16}$ to $5\times10^{20}/cm^3$ as described above, by adjusting the volume resistivity of the ceramic material other than silicon forming the partition walls 13 and the outer peripheral wall 12, and by adjusting a porosity of the partition walls 13. The concentration of the dopant(s) in silicon of the honeycomb structure can be measured, for example, by the following method. Hereinafter, a case where boron is contained as a dopant will be described. However, it should be noted that dopants other than boron can be measured by the same method.

First, the honeycomb structure is cut along a surface perpendicular to a central axis to expose a cut surface. Irregularities on a cross section of the honeycomb structure are then filled with a resin, and the surface filled with the resin is further polished. The polished surface of the honeycomb structure is then observed, and elemental analysis of a material forming the honeycomb structure is carried out by energy dispersive X-ray spectroscopy (EDX analysis: Energy Dispersive X-ray Spectroscopy).

Subsequently, for a portion of the polished surface which has been determined to be "silicon", whether or not "other elements" are contained in the silicon is determined by the following method. First, for portions where the silicon element has been detected, a portion where elements other than silicon have been detected is determined as "other components" by mapping of a cross-sectional structure photograph and an electron probe microanalyzer (EPMA analysis: Electron Probe Micro Analyzer) for the polished surface. The "other elements" include boron, and metal borides or borides present in silicon as boron sources.

Subsequently, the portion where the silicon element alone or silicon and boron has/have been detected by the EPMA analysis and it has been determined as "silicon", an amount of boron in silicon is identified by the following method. First, the honeycomb structure including the portion determined as "silicon" is cut into a thickness having a few millimeters, and the cut honeycomb structure is subjected to a cross-section preparation using a Broad Ion Beam method, thereby preparing a sample for measuring the amount of boron. The Broad Ion Beam method is a method for preparing a sample cross section using an argon ion beam. More particularly, it refers to a method for preparing a sample cross section along an end face of a shielding plate by placing the shielding plate directly above the sample, and etching the sample by irradiating it with a broad ion beam of argon from an upper side of the shielding plate. The sample subjected to the cross-sectional preparation is then analyzed for boron in silicon by time-of-flight secondary mass spectrometry (Time-of-Flight Secondary Mass Spectrometry: TOF-SIMS). In the time-of-flight secondary mass spectrometry, the sample is firstly irradiated with a primary ion beam to emit secondary ions from the surface of the sample. The released secondary ions are then introduced into a time-of-flight mass spectrometer to obtain a mass spectrum of the outermost surface of the sample. The sample is then analyzed based on the obtained mass spectrum, and a concentration of boron in silicon (pieces/cm$^3$) is determined by converting it based on correlation between a spectral intensity of boron in silicon and measured concentration values previously measured (e.g., a calibration curve).

Per 100 parts by mass of the partition walls 13 and the outer peripheral wall 12, the ceramics forming the partition walls 13 and the outer peripheral wall 12 contain 30% by mass or more of silicon. Such a configuration can allow a structure in which the doped silicon-containing materials having lower resistance are microscopically arranged in series to be easily taken. As a result, the volume resistivity of the honeycomb structure 10 can be decreased, and the generation of the excess current can be satisfactorily suppressed even if it is used for a lower voltage of 60 V or less such as 48 V. Further, such a configuration can provide a higher ratio of strength and Young's modulus of the honeycomb structure 10, so that the thermal shock resistance can be improved. More preferably, the ceramics forming the partition walls 13 and the outer peripheral wall 12 contain silicon in an amount of 30% by mass or more and less than 100% by mass, and more preferably 40% by mass or more and less than 100% by mass.

As a method for calculating the content of silicon in the partition walls and the outer peripheral wall includes, for example, the following method. In the following method, a calculation method when silicon and silicon carbide are used as ceramic raw materials will be described. When silicon and silicon carbide are used as ceramic raw materials, the composition of each of the partition walls and the outer peripheral wall after the formation of the honeycomb structure is composed of silicon (Si), silicon carbide (SiC), and silicon dioxide ($SiO_2$). For the compositional amounts of Si, SiC, and $SiO_2$ in the partition walls and the outer peripheral wall, the amounts of silicon elements and oxygen elements can be measured by a fluorescent X-ray method, and the amounts of carbon elements can measured by a resistance heating type infrared absorption method. For the amount of SiC, assuming that the carbon elements are all based on SiC, the amount of SiC in the partition walls and the outer peripheral wall is calculated by molecular weight calculation. For the amount of $SiO_2$, assuming that the oxygen elements are all based on $SiO_2$, the amount of $SiO_2$ in the partition walls and the outer peripheral wall is calculated by molecular weight calculation. The amount of Si can be calculated from the amounts of silicon elements in accordance with the fluorescent X-ray method by subtracting the amount of Si obtained by summing the amount of Si in the SiC and the amount of Si in the $SiO_2$ from the amount of SiC and the amount of $SiO_2$ calculated above, from the total amount of the silicon elements. When a material other than silicon carbide is used as the ceramic raw material, the compositions of the partition walls and the outer peripheral wall after the formation of the honeycomb structure may be confirmed, and amounts of the elements may be then measuring by a fluorescent X-ray method or a resistance heating type infrared absorption method to calculate it.

As described above, the porosity of the partition walls 13 can be adjusted as needed, depending on the desired volume resistivity of the honeycomb structure 10. It may be preferably, for example, from 35 to 60%, and more preferably from 35 to 45%. The porosity of the partition walls of 13 of 35% or more can provide a lower heat capacity of the honeycomb structure 10, and allow the honeycomb structure 10 to be rapidly warmed. The porosity of the partition walls 13 of 60% or less can allow the strength of the honeycomb structure 10 to be sufficiently maintained. The porosity of the partition walls 13 is a value measured by a mercury porosimeter.

The outer shape of the honeycomb structure 10 is not particularly limited as long as it presents a pillar shape, and it may be, for example, a shape such as a pillar shape with circular end faces (circular pillar shape), a pillar shape with oval shaped end faces, and a pillar shape with polygonal (square, pentagonal, hexagonal, heptagonal, octagonal, and the like) end faces, and the like. Further, for the size of the honeycomb structure 10, the honeycomb structure preferably has an area of end faces of from 2000 to 20000 mm$^2$, and more preferably from 5000 to 15000 mm$^2$, in order to increase heat resistance (suppressing cracks generated in a circumferential direction of the outer peripheral side wall).

The shape of each cell 15 of the honeycomb structure 10 in a cross section perpendicular to a flow path direction of the cell is not limited, but it may preferably be a square, a hexagon, an octagon, or a combination thereof. Among these, the square and hexagonal shapes are preferable. Such a square or hexagonal cell shape leads to a decreased pressure loss when an exhaust gas flows through the honeycomb structure 10, and improved purification performance of the catalyst. The rectangle is particularly preferable in terms of easily achieving both structural strength and uniformity of heating.

The provision of the outer peripheral wall 12 is useful in terms of ensuring the structural strength of the honeycomb structure 10 and preventing a fluid flowing through the cells 15 from leaking from the outer peripheral wall 12. More particularly, the thickness of the outer peripheral wall 12 is preferably 0.1 mm or more, and more preferably 0.15 mm or more, and even more preferably 0.2 mm or more. However, if the outer peripheral wall 12 is too thick, the strength becomes too high, so that a strength balance between the outer peripheral wall and the partition wall 13 is lost to reduce thermal shock resistance. Therefore, the thickness of the outer peripheral wall 12 is preferably 1.0 mm or less, and more preferably 0.7 mm or less, and still more preferably 0.5 mm or less. As used herein, the thickness of the outer peripheral wall 12 is defined as a thickness of the outer peripheral wall 12 in a direction of a normal line to a tangential line at a measurement point when observing a portion of the outer peripheral wall 12 to be subjected to thickness measurement in a cross section perpendicular to a flow path direction of the cells.

The partition walls 13 preferably have an average pore diameter of from 2 to 15 μm, and more preferably from 4 to 8 μm. The average pore diameter of 2 μm or more of the partition walls 13 can allow the volume resistivity to be controlled to the above range. The average pore diameter of 15 μm or less of the partition walls 13 can allow the volume resistivity to be controlled to the above range. The average pore diameter is a value measured by a mercury porosimeter.

Each partition wall 13 preferably has a thickness of from 50 to 200 μm and a cell density of from 50 to 150 cells/cm$^2$. By controlling the thickness and the cell density of the partition walls 13 in such ranges, the volume resistivity of the honeycomb structure 10 can be easily decreased. Further, the thickness of the each partition wall 13 of 50 μm or more can allow a decrease in strength of the honeycomb structure 10 to be suppressed. The thickness of each partition wall 13 of 200 μm or less can suppress an increase in pressure loss upon flowing of an exhaust gas, when the honeycomb structure 10 is used as a catalyst support and a catalyst is supported thereon. Further, the cell density of the partition walls 13 of 50 cells/cm$^2$ or more can allow a catalyst supporting area to be increased and the purification performance of the catalyst to be enhanced. The cell density of the partition walls 13 of 150 cells/cm$^2$ or less can suppress an increase in pressure loss upon flowing of an exhaust gas when the honeycomb structure 10 is used as a catalyst support and a catalyst is supported thereon. More preferably, the thickness of the partition wall 13 is from 50 to 150 μm and the cell density is from 75 to 150 cells/cm$^2$. In the present invention, the thickness of the partition wall 13 is defined as a length of a portion passing through the partition wall 13, among line segments connecting centers of gravity of the adjacent cells 15 in a cross section perpendicular to the extending direction of the cells 15. Also, in the present invention, the cell density is a value obtained by dividing the number of cells by an area of one end face of the honeycomb structure 10 excluding the outer peripheral wall 12.

Figure 2:
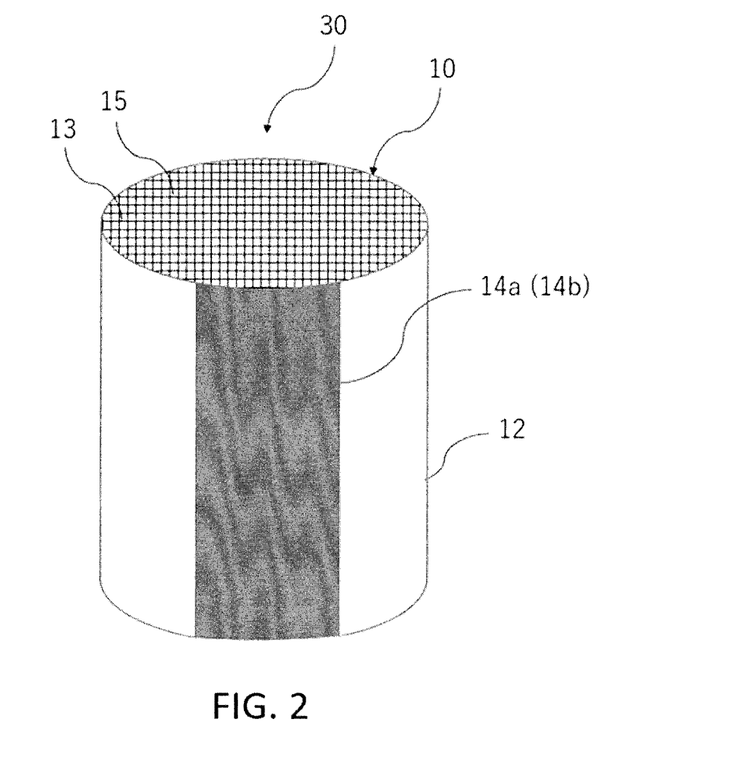
FIG. 2 is a schematic external view of an electric heating type honeycomb structure 30 according to an embodiment of the present invention.

FIG. 2 is a schematic external view of an electric heating type honeycomb structure 30 according to an embodiment of the present invention. The electric heating type honeycomb structure 30 according to the embodiment of the present invention includes: the above honeycomb structure 10; and a pair of electrode layers 14a, 14b arranged so as to face each other across a central axis of the honeycomb structure 10, on the surface of the outer peripheral wall 12 of the honeycomb structure 10. Each of the electrode layers 14a, 14b is electrically connected to the honeycomb structure 10. This structure can allow the electric heating type honeycomb structure 30 to suppress a bias of a current flowing through the honeycomb structure 10 when a voltage is applied, whereby a bias of a temperature distribution in the honeycomb structure 10 can be suppressed. A shape and size of each of the electrode layers 14a, 14b are not particularly limited, and they can be designed as needed, depending on the size of the electric heating type honeycomb structure 30 and/or electrical conduction performance. For example, each of the electrode layers 14a, 14b may be provided in a strip shape extending in the extending direction of the cells 15 of the honeycomb structure 10.

The electrode layers 14a, 14b are formed of a conductive material. The electrode layers 14a, 14b are preferably made of an oxide ceramic or a mixture of a metal or a metal compound with an oxide ceramic. The metal may be either a single metal or an alloy, and for example, silicon, aluminum, iron, stainless steel, titanium, tungsten, a Ni—Cr alloy, or the like can be suitably used. Examples of the metal compound include compounds other than oxide ceramics, such as metal oxides, metal nitrides, metal carbides, metal silicides, metal borides, and composite oxides. For example, $FeSi_2$, $CrSi_2$, alumina, silica, titanium oxide or the like can be suitably used. Each of the metal and the metal compound may be used alone or in combination of two or more. Specific examples of the oxide ceramic include glass, cordierite, and mullite. The glass may further contain an oxide composed of at least one component selected from the group consisting of B, Mg, Al, Si, P, Ti and Zr. It is more preferable to further contain at least one selected from the above group in that the strength of the electrode layers 14a, 14b is further improved.

The production of the honeycomb structure 10 can be carried out according to a method for producing a honeycomb structure in the known method for producing the honeycomb structure. For example, first, a binder, a surfactant, a pore former, water and the like are added to silicon powder containing an added dopant(s), or silicon powder obtained by mixing other ceramic material with that silicon powder containing the added dopant(s), to form a forming raw material. Silicon to be contained in the forming raw material is preferably mixed so as to be 30 parts by mass or more and less than 100 parts by mass, per 100 parts by mass of the partition walls 13 and the outer peripheral wall 12 of the honeycomb structure 10 produced through the firing step and the like. Further, the amount of the dopant is appropriately adjusted depending on the dopant elements such that the concentration of the dopant in silicon is $10^{16}$ to $5\times10^{20}/cm^3$ in the honeycomb structure 10 produced through the firing step and the like. The silicon powder preferably has an average particle diameter of from 3 to 50 μm, and more preferably from 3 to 40 μm. The average particle diameter of the silicon powder refers to an arithmetic average diameter on a volume basis when frequency distribution of the particle diameter is measured by a laser diffraction method.

Examples of the binder include methyl cellulose, hydroxypropyl methyl cellulose, hydroxypropoxyl cellulose, hydroxyethyl cellulose, carboxymethyl cellulose, polyvinyl alcohol and the like. Among these, it is preferable to use methyl cellulose in combination with hydroxypropoxyl cellulose. The content of the binder is preferably from 2.0 to 10.0 parts by mass, per 100 parts by mass of the silicon powder containing the added dopant(s) or the powder obtained by mixing other ceramic material with the silicon powder containing the added dopant(s).

The content of water is preferably from 20 to 60 parts by mass per 100 parts by mass of the silicon powder containing the added dopant(s) or the powder obtained by mixing other ceramic material with the silicon powder containing the added dopant(s).

The surfactant that can be used includes ethylene glycol, dextrin, fatty acid soaps, polyalcohol and the like. These may be used alone or in combination of two or more. The content of the surfactant is preferably from 0.1 to 2.0 parts by mass per 100 parts by mass of the silicon powder containing the added dopant(s) or the powder obtained by mixing other ceramic material with the silicon powder containing the added dopant(s).

The pore former is not particularly limited as long as the pore former itself forms pores after firing, including, for example, graphite, starch, foamed resins, water absorbing resins, silica gel and the like. The content of the pore former is preferably from 0.5 to 10.0 parts by mass per 100 parts by mass of the silicon powder containing the added dopant(s) or the powder obtained by mixing other ceramic material with the silicon powder containing the added dopant(s). An average particle diameter of the pore former is preferably from 10 to 30 µm. When it is more than 10 µm, pores may preferably be sufficiently formed. If it is less than 30 µm, it is difficult to clog a die with the pore former during forming, which is preferable. The average particle size of the pore former refers to an arithmetic average diameter on volume basis when frequency distribution of the particle size is measured by the laser diffraction method. When the pore former is the water absorbing resin, the average particle diameter of the pore former is an average particle diameter after water absorption.

Then, the resulting forming raw materials are kneaded to form a green body, and the green body is then extruded to prepare a raw (unfired) pillar shaped honeycomb structure. In extrusion molding, a die having a desired overall shape, cell shape, partition wall thickness, cell density and the like can be used. Preferably, the resulting unfired pillar shaped honeycomb structure is dried. When the length in the central axis direction of the pillar shaped honeycomb structure is not the desired length, both the end faces of the pillar shaped honeycomb structure can be cut to the desired length.

The unfired pillar shaped honeycomb structure is then fired to prepare a honeycomb structure 10. Before firing, calcination may preferably be carried out in order to remove the binder and the like. The calcination is preferably performed in an air atmosphere at a temperature of from 400 to 500° C. for 0.5 to 20 hours. The methods of calcination and firing are not limited, and they may be carried out using an electric furnace, a gas furnace or the like. The firing can be preferably carried out in an inert atmosphere such as nitrogen and argon at a temperature of from 1300 to 1500° C. for 1 to 20 hours. After firing, an oxidation treatment is preferably carried out at a temperature of from 1200 to 1350° C. for 1 to 10 hours in order to improve durability. Thus, the honeycomb structure 10 according to the embodiment of the present invention can be produced.

The electric heating type honeycomb structure 30 according to the embodiment of the present invention can be produced by arranging the pair of electrode layers 14a, 14b on the honeycomb structure 10 so as to face each other across the central axis of the honeycomb structure 10.

(2. Electric Heating Type Support)

Figure 3:
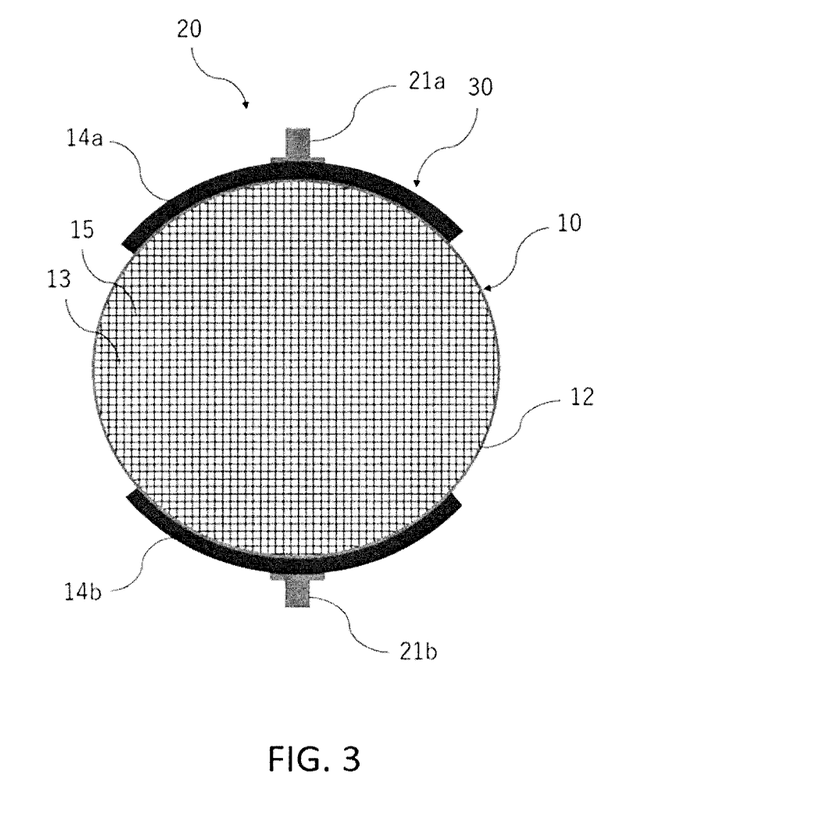
FIG. 3 is a schematic cross-sectional view of an electric heating type support 20, which is perpendicular to an extending direction of cells according to an embodiment of the present invention.

FIG. 3 is a schematic cross-sectional view of an electric heating type support 20 according to an embodiment of the present invention, which is perpendicular to the extending direction of the cells. The electric heating type carrier 20 includes the electric heating type honeycomb structure 30 and a pair of metal terminals 21a, 21b. The pair of metal terminals 21a, 21b is disposed so as to face each other across the central axis of the pillar shaped honeycomb structure 10 of the honeycomb structure 10, and is provided on the pair of electrode layers 14a, 14b, respectively, and is electrically connected. Accordingly, as a voltage is applied to the metal terminals 21a, 21b through the electrode layers 14a, 14b, then the electricity is conducted through the metal terminals 21a, 21b to allow the electric heating type honeycomb structure 30 to generate heat by Joule heat. Therefore, the electric heating type honeycomb structure 30 can also be suitably used as a heater.

The material of the metal terminals 21a, 21b is not particularly limited as long as it is a metal, and a single metal, an alloy, or the like can be employed. In terms of corrosion resistance, electrical resistivity and linear expansion coefficient, for example, the material is preferably an alloy containing at least one selected from the group consisting of Cr, Fe, Co, Ni and Ti, and more preferably stainless steel and Fe—Ni alloys. The shape and size of each of the metal terminals 21a, 21b are not particularly limited, and they can be appropriately designed according to the size of the electric heating type support 20, the electrical conduction performance, and the like.

By supporting the catalyst on the electric heating type support 20, the electric heating type support 20 can be used as a catalyst. For example, a fluid such as an exhaust gas from a motor vehicle can flow through the flow paths of the plurality of cells 15. Examples of the catalyst include noble metal catalysts or catalysts other than them. Illustrative examples of the noble metal catalysts include a three-way catalyst and an oxidation catalyst obtained by supporting a noble metal such as platinum (Pt), palladium (Pd) and rhodium (Rh) on surfaces of pores of alumina and containing a co-catalyst such as ceria and zirconia, or a lean nitrogen oxides trap catalyst (LNT catalyst) containing an alkaline earth metal and platinum as storage components for nitrogen oxides ($NO_x$). Illustrative examples of a catalyst that does not use the noble metal include a NOx selective catalytic reduction catalyst (SCR catalyst) containing a copper-substituted or iron-substituted zeolite, and the like. Further, two or more catalysts selected from the group consisting of those catalysts may be used. A method for supporting the catalyst is not particularly limited, and it can be carried out according to a conventional method for supporting the catalyst on the honeycomb structure.

(3. Exhaust Gas Purifying Device)

The electric heating type support 20 according to the above embodiment of the present invention can be used for an exhaust gas purifying device. The exhaust gas purifying device includes the electric heating type support 20 and a can body for holding the electric heating type support 20. In the exhaust gas purifying device, the electric heating type support 20 can be installed in an exhaust gas flow path for allowing an exhaust gas from an engine to flow. As the can body, a metal tubular member or the like for accommodating the electric heating type support 20 can be used.

EXAMPLES

Hereinafter, Examples are illustrated for better understanding of the present invention and its advantages, but the present invention is not limited to these Examples.

(1. Production of Honeycomb Structure)

As Examples 2 to 14, 17 to 21 and Comparative Examples 1, 15, 16 and 22, silicon powder, silicon carbide powder, and boron nitride were mixed so as to have the proportions as shown in the "Recipe" column of Table 1 to prepare a ceramic raw material. To the ceramic raw material were added hydroxypropyl methyl cellulose as a binder, a water absorbing resin as a pore former, and water to form a forming raw material. The forming raw material was then kneaded by means of a vacuum green body kneader to prepare a circular pillar shaped green body. The content of the binder was 7 parts by mass per 100 parts by mass of the total of the silicon powder and the silicon carbide powder. The content of the pore former was 3 parts by mass per 100 parts by mass of the total of the silicon powder and the silicon carbide powder. The content of water was 42 parts by mass per 100 parts by mass of total of the silicon powder and the silicon carbide powder. The average particle diameter of the silicon particles was 6 µm. The average particle diameter of the pore former was 20 µm. The average particle diameter of each of the silicon particles and the pore former refers to an arithmetic mean diameter on volume basis, when measuring frequency distribution of the particle size by the laser diffraction method.

The resulting pillar shaped green body was formed using an extruder to obtain a pillar shaped honeycomb structure portion in which each cell had a square cross-sectional shape. The resulting unfired pillar shaped honeycomb structure portion was subjected to high-frequency dielectric heating and drying and then dried at 120° C. for 2 hours using a hot air drier, and a predetermined amount of both end faces were cut to prepare a honeycomb structure.

The dried honeycomb structure was degreased (calcined), fired and further oxidized to obtain a honeycomb fired body. The degreasing was carried out at 500° C. for 3 hours. The firing was carried out in an argon atmosphere at 1400° C. for 2 hours. The oxidation was carried out at 1300° C. for 1 hour.

(2. Formation of Electrode Layer)

A pair of electrode layers was provided so as to face each other across the central axis of the honeycomb structure. The conditions for forming the electrode layers are as follows. That is, first, stainless steel powder (SUS430) and glass powder were mixed at a volume ratio of 40% stainless powder and 60% glass powder to prepare a ceramic raw material. The average particle diameter was 10 µm for stainless powder and 2 µm for glass powder. The average particle diameter refers to an arithmetic average diameter on a volume basis when frequency distribution of particle diameters is measured by the laser diffraction method.

Subsequently, to the above ceramic raw material were added 1% by mass of a binder, 1% by mass of a surfactant, and 30% by mass of water to prepare a paste. The paste was then applied to the honeycomb structure using screen printing. The applied paste was dried in a hot air drier at 120° C. for 30 minutes, and then fired together with the honeycomb structure in vacuum at 1100° C. for 30 minutes to form electrode layers. Thus, an electric heating type honeycomb structure was produced.

(3. Evaluation Test)

The concentration of the dopant (boron concentration) in silicon of the resulting electric heating type honeycomb structure was measured by the method as described above, indicating that it was $6 \times 10^{15}/cm^3$.

The composition of each of Si, SiC, and $SiO_2$ in the partition walls and the outer peripheral walls of the resulting electric heating type honeycomb structure was measured by the above method. Table 1 shows measured results.

The resulting electric heating type honeycomb structure had a thickness of each partition wall of 125 µm and a cell density of 90 cells/$cm^2$. The cell density was calculated by dividing the number of cells by an area of one end face portion of the honeycomb structure excluding the outer peripheral wall portion.

The porosity of the partition walls of the resulting electric heating type honeycomb structure was measured by a mercury porosimeter.

Further, a pair of metal terminals was electrically connected to the pair of electrode layers of the resulting electric heating type honeycomb structure, respectively. A voltage of 48 V was then applied to the electric heating type honeycomb structure through the metal terminals, and a current value was measured. From the voltage and the current value, the volume resistivity of the electric heating type honeycomb structure was calculated.

The evaluation results are shown in Table 1.

TABLE 1

| | | Recipe | | | Contents in Partition Walls and Outer Peripheral Wall | | | | | Volume |
|---|---|---|---|---|---|---|---|---|---|---|
| | No. | Si wt. % | SiC wt. % | BN wt. % | Si wt. % | SiC wt. % | $SiO_2$ wt. % | B in Si pieces/$cm^3$ | Porosity % | Resistivity $\Omega \cdot cm$ |
| Comp. | 1 | 50 | 50 | 0.00003 | 46 | 42 | 12 | 6E+15 | 44 | 12.92 |
| Example | 2 | 50 | 50 | 0.0001 | 46 | 42 | 12 | 2E+16 | 44 | 4.90 |
| Example | 3 | 50 | 50 | 0.0003 | 46 | 42 | 12 | 6E+16 | 44 | 2.62 |
| Example | 4 | 50 | 50 | 0.003 | 46 | 42 | 12 | 6E+17 | 44 | 0.94 |
| Example | 5 | 50 | 50 | 0.03 | 46 | 42 | 12 | 6E+18 | 44 | 0.24 |
| Example | 6 | 50 | 50 | 0.01 | 46 | 42 | 12 | 2E+18 | 44 | 0.42 |
| Example | 7 | 50 | 50 | 0.3 | 46 | 42 | 12 | 6E+19 | 45 | 0.05 |
| Example | 8 | 50 | 50 | 0.1 | 46 | 42 | 12 | 2E+19 | 44 | 0.12 |
| Example | 9 | 50 | 50 | 1 | 46 | 42 | 12 | 2E+20 | 44 | 0.03 |
| Example | 10 | 50 | 50 | 3 | 46 | 42 | 12 | 5E+20 | 44 | 0.02 |
| Example | 11 | 100 | 0 | 0.03 | 92 | 0 | 8 | 1E+19 | 40 | 0.08 |
| Example | 12 | 80 | 20 | 0.03 | 73 | 17 | 10 | 9E+18 | 42 | 0.11 |
| Example | 13 | 60 | 40 | 0.03 | 55 | 34 | 11 | 7E+18 | 43 | 0.18 |
| Example | 14 | 40 | 60 | 0.03 | 37 | 51 | 13 | 5E+18 | 45 | 0.38 |

TABLE 1-continued

| | | Recipe | | | Contents in Partition Walls and Outer Peripheral Wall | | | | Volume |
|---|---|---|---|---|---|---|---|---|---|
| No. | Si wt. % | SIC wt. % | BN wt. % | Si wt. % | SiC wt. % | $SiO_2$ wt. % | B in Si pieces/$cm^3$ | Porosity % | Resistivity $\Omega \cdot cm$ |
| Comp. 15 | 30 | 70 | 0.03 | 27 | 59 | 13 | 4E+18 | 46 | 7.30 |
| Comp. 16 | 25 | 75 | 0.03 | 23 | 63 | 14 | 3E+18 | 46 | 30.41 |
| Example 17 | 100 | 0 | 0.3 | 92 | 0 | 8 | 1E+20 | 40 | 0.02 |
| Example 18 | 80 | 20 | 0.3 | 73 | 17 | 10 | 9E+19 | 42 | 0.03 |
| Example 19 | 60 | 40 | 0.3 | 55 | 34 | 11 | 7E+19 | 43 | 0.05 |
| Example 20 | 40 | 60 | 0.3 | 37 | 51 | 13 | 5E+19 | 44 | 0.14 |
| Example 21 | 35 | 65 | 0.3 | 32 | 55 | 13 | 4E+19 | 44 | 0.20 |
| Comp. 22 | 25 | 75 | 0.3 | 23 | 63 | 14 | 3E+19 | 46 | 5.42 |

(4. Discussion)

As shown in Table 1, in Examples 2 to 14 and Examples 17 to 21 according to the present invention, the partition walls and the outer peripheral wall of the honeycomb structure were made of ceramics containing at least silicon, and had a silicon content of 30% by mass or more, and a concentration of the dopant in silicon of $10^{16}$ to $5 \times 10^{20}$/$cm^3$, so that the volume resistivity could be lower and the generation of the excess current could be satisfactorily suppressed even at a lower voltage of 48 V.

In Comparative Example 1, the volume resistivity was larger because the concentration of the dopant in silicon on the partition walls and the outer peripheral wall of the honeycomb structure was less than $10^{16}$/$cm^3$.

In Comparative Examples 15, 16 and 22, the ceramics forming the partition walls and the outer peripheral wall of the honeycomb structure had a silicon content of less than 30% by mass, so that the volume resistivity was larger.

The Present application claims priority from Japanese Patent Application No. 2019-113001, filed on Jun. 18, 2019, the entire contents of which are incorporated herein by reference.

DESCRIPTION OF REFERENCE NUMERALS 10 honeycomb structure
12 outer peripheral wall
13 partition wall
14a, 14b electrode layer
15 cell
20 electric heating type support
21a, 21b metal terminal
30 electric heating type honeycomb structure

What is claimed is:

1. A honeycomb structure, comprising:
an outer peripheral wall; and
partition walls disposed on an inner side of the outer peripheral wall, the partition walls defining a plurality of cells, each of the plurality of cells extending from one end face to the other end face to form a flow path for a fluid,
wherein the partition walls and the outer peripheral wall comprise ceramics containing at least silicon;
wherein a content of silicon in the ceramics is 30% by mass or more;
wherein a concentration of at least one dopant in the silicon is from $10^{16}$ to $5 \times 10^{20}$/$cm^3$.

2. The honeycomb structure according to claim 1, wherein the at least one dopant is a Group 13 element or a Group 15 element.

3. The honeycomb structure according to claim 2, wherein the at least one dopant is one or two selected from the group consisting of B and Al.

4. The honeycomb structure according to claim 2, wherein the at least one dopant is one or two selected from the group consisting of N and P.

5. The honeycomb structure according to claim 1, wherein the ceramics forming the partition walls and the outer peripheral wall contains the silicon in an amount of 30% by mass or more and less than 100% by mass.

6. The honeycomb structure according to claim 1, wherein the honeycomb structure has a thickness of each of the partition walls of from 50 to 200 μm, and a cell density of from 50 to 150 cells/$cm^2$.

7. The honeycomb structure according to claim 1, wherein the partition walls and the outer peripheral wall further contain at least one selected from the group consisting of alumina, mullite, zirconia, cordierite, silicon carbide, silicon nitride, and aluminum nitride.

8. An electric heating type honeycomb structure, comprising:
the honeycomb structure according to claim 1; and
a pair of electrode layers disposed so as to face each other across a central axis of the honeycomb structure, each of the electrode layers being disposed on a surface of the outer peripheral wall of the honeycomb structure.

9. An electric heating type support, comprising:
the electric heating type honeycomb structure according to claim 8; and
a pair of metal terminals disposed so as to face each other across a central axis of the electric heating type honeycomb structure, the pair of metal terminals being disposed on the pair of the electrode layers.

10. An exhaust gas purifying device, comprising:
the electric heating type support according to claim 9; and
a can body for holding the electric heating type support.

11. A honeycomb structure, comprising: an outer peripheral wall; and partition walls disposed on an inner side of the outer peripheral wall, the partition walls defining a plurality of cells, each of the plurality of cells extending from one end face to the other end face to form a flow path for a fluid,
wherein the partition walls and the outer peripheral wall comprise ceramics, wherein the ceramics contain:
silicon; and
at least one selected from the group consisting of alumina, mullite, zirconia, cordierite, silicon carbide, silicon nitride, and aluminum nitride;
wherein a content of silicon in the ceramics is 30% by mass or more;
wherein the silicon contains B as a dopant; and wherein the honeycomb structure has a volume resistivity of 0.01 Ω·cm or more and 5 Ω·cm or less.

* * * * *